United States Patent Office.

L. F. LEGER, OF NEW YORK, N. Y.

Letters Patent No. 95,492, dated October 5, 1869.

---

IMPROVED CHOCOLATE-PASTE.

---

The Schedule referred to in these Letters Patent and making part of the same.

---

*To all whom it may concern:*

Be it known that I, L. F. LEGER, of the city, county, and State of New York, have invented a new and improved Chocolate-Paste; and I do hereby declare that the following is a full, clear, and exact description thereof, which will enable others skilled in the art to make and use the same.

The object of this invention is to so prepare chocolate that it can be preserved in a semi-liquid state, to be readily dissolved when required. Thereby much time in the preparation of this healthy and agreeable beverage is economized, and a more marketable article produced.

Heretofore chocolate was prepared by mixing the molten cocoa with powdered sugar, and by then pressing the compound into a suitable form. The mixture would readily dry and become hard.

In order to prepare it for a drink, the chocolate itself had to be boiled to dissolve it, and much of its aroma and essential oils were thereby evaporated and lost.

My invention consists in preparing the sugar so as to make sirups of it, which will not harden, and, therefore, retain the chocolate in a pasty state.

The loss of flavor and substance, occasioned by the cooking of the chocolate, is overcome.

Such paste can be readily dissolved in hot or warm milk, or other liquid.

For children it will be useful, and can be given in the pasty state without being as difficult to digest as the hard chocolate.

The following is an accurate description of my improved method of preparing the paste:

The best fine sugar is boiled in water until it forms a semi-liquid sirup. It is then allowed to cool.

The cocoa is exposed to heat in a dry oven, or otherwise, whereby it will melt, and, when molten, it is added to the cold sirup, made from the sugar, as above.

Suitable flavoring ingredients, such as vanilla, lemon, or other matters may be added to the compound, which is well stirred until all the parts are thoroughly mixed together.

The paste thus produced, can now be filled into bottles, jars, or other receptacles, and preserved for use for a suitable length of time.

A crust will form on the surface, which will protect the matter below from the influence of the atmosphere.

The proportions should be about forty parts of cocoa to sixty of sugar, but may be varied more or less.

Having thus described my invention,

I claim as new, and desire to secure by Letters Patent—

The chocolate-paste, made substantially in the manner and of the ingredients herein specified.

L. F. LEGER.

Witnesses:
   GEO. W. MABEE,
   WM. F. CLARK.